United States Patent
Yang et al.

(10) Patent No.: US 9,238,306 B2
(45) Date of Patent: Jan. 19, 2016

(54) FEEDING DEVICE AND MACHINE TOOL USING THE SAME

(71) Applicants: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(72) Inventors: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 623 days.

(21) Appl. No.: 13/705,788

(22) Filed: Dec. 5, 2012

(65) Prior Publication Data
US 2014/0020536 A1      Jan. 23, 2014

(30) Foreign Application Priority Data

Jul. 20, 2012 (CN) .......................... 2012 1 0252861

(51) Int. Cl.
*B23Q 1/01* (2006.01)
*B26D 5/00* (2006.01)
*B23B 5/36* (2006.01)
(Continued)

(52) U.S. Cl.
CPC ... *B26D 5/00* (2013.01); *B23B 5/36* (2013.01); *B23Q 1/012* (2013.01); *B23Q 1/017* (2013.01); *B23Q 1/626* (2013.01); *B23Q 5/28* (2013.01); *Y10T 83/566* (2015.04)

(58) Field of Classification Search
CPC .......... B23Q 11/0816; B23Q 11/0819; B23Q 11/0891
USPC ............................................................ 82/141
See application file for complete search history.

(56) References Cited

U.S. PATENT DOCUMENTS

| 4,346,444 | A | * | 8/1982 | Schneider | .......... G05B 19/4163 318/571 |
| 4,451,892 | A | * | 5/1984 | McMurtry | ............. G01B 7/008 318/572 |

(Continued)

FOREIGN PATENT DOCUMENTS

| CN | 201186387 Y | 1/2009 |
| DE | 19650360 A1 | 5/1998 |

(Continued)

*Primary Examiner* — Will Fridie, Jr.
(74) *Attorney, Agent, or Firm* — Novak Druce Connolly Bove + Quigg LLP

(57) ABSTRACT

A feeding device includes a tool holder, a cutter, a feeding mechanism and a mounting seat. The cutter is positioned on the tool holder. The mounting seat has at least one guiding portion. The tool holder is slidably engaged with the at least one guiding portion. The feeding mechanism includes at least two drivers. Each driver includes a forcer and a stator. The forcers are mounted in the mounting seat, the stators are fixedly positioned on the tool holder. Interactions between alternating magnetic fields produced by the forcers and magnetic fields produced by the stators drive the tool holder and the cutter to backwards and forwards under precise control along the guiding portion.

20 Claims, 5 Drawing Sheets

(51) Int. Cl.
 *B23Q 1/62* (2006.01)
 *B23Q 5/28* (2006.01)
 *B23Q 1/00* (2006.01)

(56) References Cited

U.S. PATENT DOCUMENTS

| | | | | |
|---|---|---|---|---|
| 4,658,485 | A | * | 4/1987 | Yang ...................... B23Q 1/012 29/26 A |
| 4,741,231 | A | * | 5/1988 | Patterson ................... G01L 1/16 310/338 |
| 7,192,225 | B2 | * | 3/2007 | Takayama .......... B23Q 11/0816 409/134 |
| 8,529,420 | B2 | * | 9/2013 | Meidar .................. B23Q 1/012 29/33 P |
| 8,845,246 | B2 | * | 9/2014 | Tullmann ............... B23Q 1/012 409/189 |
| 2006/0052038 | A1 | * | 3/2006 | Klein ....................... B23Q 5/10 451/11 |
| 2010/0207496 | A1 | * | 8/2010 | Tatsuda .................... B23Q 1/70 310/67 R |

FOREIGN PATENT DOCUMENTS

| | | |
|---|---|---|
| JP | H11309602 A | 11/1999 |
| JP | 2004130468 A | 4/2004 |
| TW | 553045 | 9/2003 |
| TW | M286741 | 2/2006 |

\* cited by examiner

FEEDING DEVICE AND MACHINE TOOL USING THE SAME

CROSS-REFERENCE TO RELATED APPLICATIONS

This application claims all benefits accruing under 35 U.S.C. §119 from China Patent Application No. 201210252861.X, filed on Jul. 20, 2012, in the China Intellectual Property Office, the disclosure of which is incorporated herein by reference. The application is also related to co-pending applications entitled, "MACHINE TOOL WITH UNINTERRUPTED CUTTING" U.S. Ser. No. 13/705,843; "METHOD FOR MACHINING CURVED SURFACE USING LATHE" U.S. Ser. No. 13/705,777; "LATHE FOR MACHINING CURVED SURFACES" U.S. Ser. No. 13/705,713; "FEEDING DEVICE AND MACHINE TOOL USING THE SAME" U.S. Ser. No. 13/705,611; "LATHE WITH TWO CROSS BEAMS" U.S. Ser. No. 13/705,585; "LATHE CONTROL SYSTEM" U.S. Ser. No. 13/705,545; "WORKPIECE HAVING NON-ROTATARY SURFACE MACHINED BY LATHE" U.S. Ser. No. 13/705,478; "LATHE FOR MACHINING CURVED SURFACES" U.S. Ser. No. 13/705,383.

BACKGROUND

1. Technical Field

The present disclosure generally relates to feeding devices, and particularly, to a feeding device which can machine a curved surface, and a machine tool using the same.

2. Description of the Related Art

In the manufacturing field, a cutter of the machine tool is driven to move by a feeding device of the machine tool, and also driven to rotate at high speed by a main shaft of the machine tool at the same time for machining a curved surface of a workpiece. However, after completing machining a first position of the workpiece, the feeding device needs to be driven to lift, and move a certain distance to a second position of the workpiece. This consumes more time, and the machining efficiency is decreased. In addition, sometimes only one driver is positioned in the feeding device for driving the cutter. However, if the driver is designed to supply great force and pressure, the size of the driver needs to be unduly larger, such that the feeding device requires more setup space.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
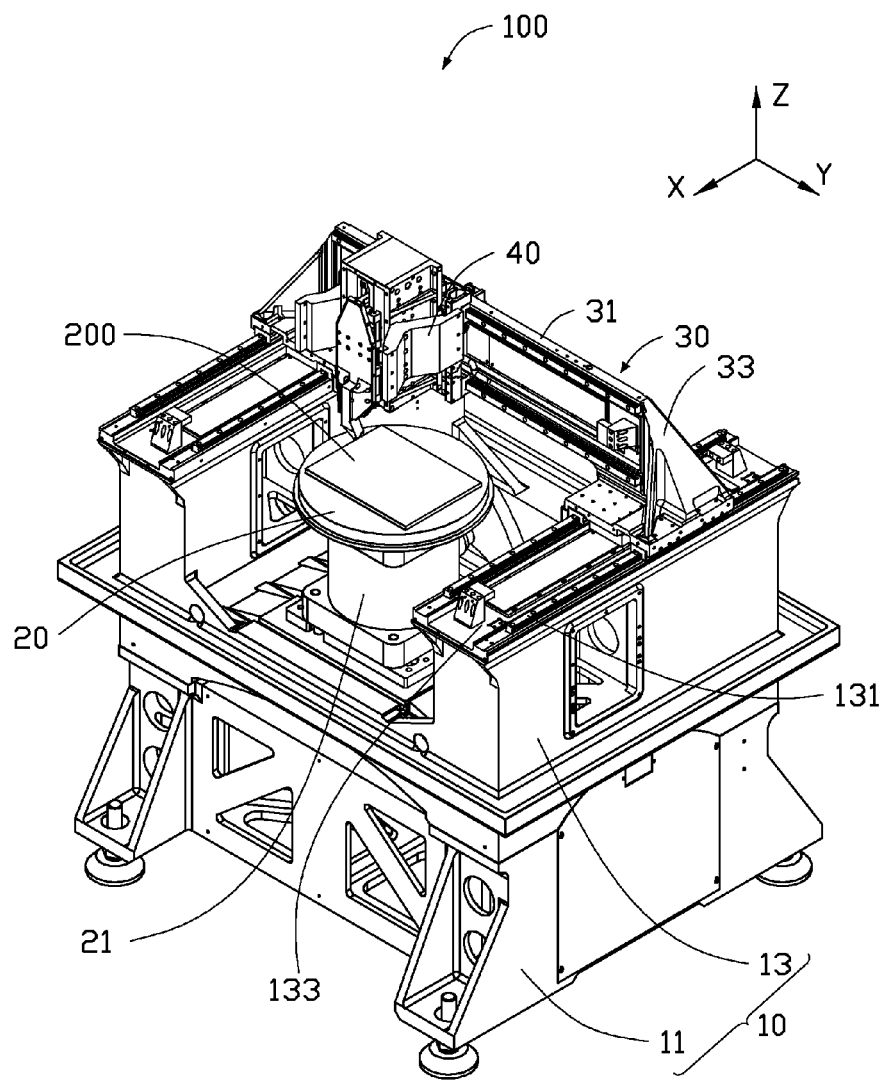
FIG. 1 is an isometric view of an embodiment of a machine tool having a feeding device.
Figure 2:
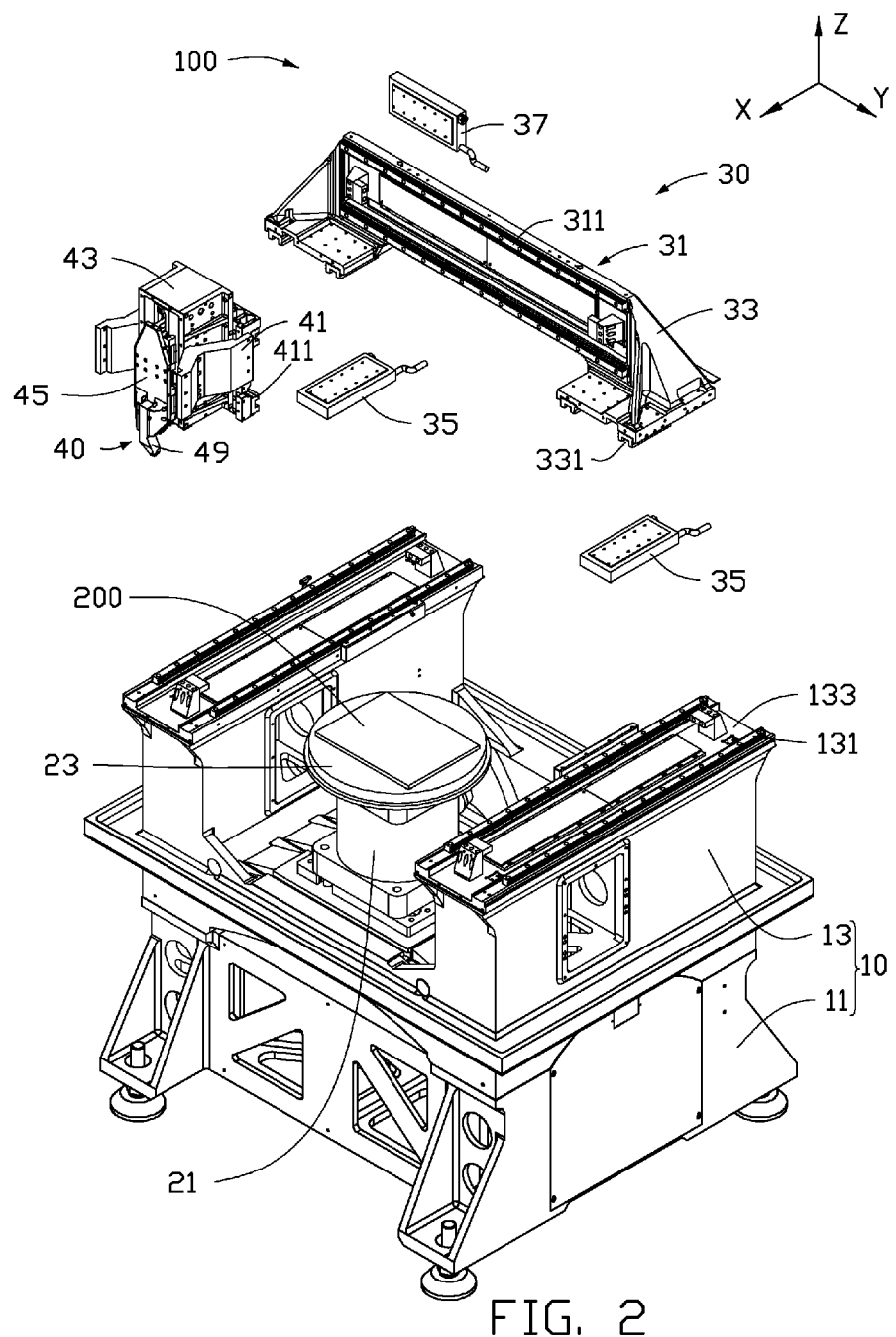
FIG. 2 is an exploded, isometric view of the machine tool of FIG. 1.

Referring to FIGS. 1 and 2, an embodiment of a machine tool 100 is shown. The machine tool 100 is used for machining a curved surface of a workpiece 200. The machine tool 100 includes a machine support 10, a work table 20, a moving device 30, a feeding device 40, and a controller (not shown). The work table 20 holds the workpiece 200 in place, and is supported by the machine support 10. The moving device 30 is movably positioned on the machine support 10 above the work table 20. The feeding device 40 is slidably mounted on the moving device 30. The controller is electrically connected with the work table 20, the moving device 30 and the feeding device 40 for controlling the machine tool 100. Under the control of the controller, the moving device 30 can be driven to move with the feeding device 40, such that the feeding device 40 can be driven three-dimensionally along Cartesian coordinates, that is, along an X, a Y, and a Z axis.

The machine support 10 includes a base 11 and a pair of support bodies 13 positioned parallel on the base 11. A pair of first sliding rails 131 are positioned parallel on a surface of each support body 13 away from the base 11, and arranged apart from each other. In the illustrated embodiment, the first sliding rails 131 extend parallel to the X-axis. A receiving groove 133 is formed on each support body 13 between the two first sliding rails 131.

Referring also to FIG. 2, the work table 20 is substantially cylindrical, and rotatably positioned on the base 11 between the two support bodies 13. The work table 20 includes a rotating driver 21 and a support member 23 fixedly connected with the rotating driver 21 away from the base 11. The rotating driver 21 is electrically connected to the controller. In the illustrated embodiment, the rotating driver 21 is a direct drive motor.

The moving device 30 is slidably perpendicularly mounted on the pair of support bodies 13 above the work table 20. The moving device 30 includes a cross beam 31, two sliding bases 33, two first driving mechanisms 35, and a second driving mechanism 37. Two ends of the cross beam 31 are slidably positioned on the support bodies 13 via the pair of the sliding bases 33. The extending direction of the cross beam 31 is parallel to the Y-axis. The pair of second sliding rails 311 are positioned on a side surface of the cross beam 31 adjacent to the work table 20 and extending parallel to the Y-axis. The two sliding bases 33 are installed on the opposite ends of the cross beam 31 to slidably connect with the first sliding rails 131. Each first driving mechanism 35 is mounted on a surface of one sliding base 33 away from the cross beam 31 and is received in the receiving groove 133. The first driving mechanisms 35 drive the cross beam 31 to move along the first sliding rails 131. The second driving mechanism 37 is mounted on the cross beam 31 to move the feeding device 40 along the second sliding rails 311. The first driving mechanisms 35 and the second driving mechanism 37 are electrically connected to the controller. In the illustrated embodiment, the first driving mechanisms 35 and the second driving mechanism 37 are linear motors. In other embodiments, the first driving mechanisms 35 and the second driving mechanism 37 may be replaced by other drivers, such as hydraulic cylinders or rams. The number of the first driving mechanisms 35 and the second driving mechanism 37 may be designed according to real applications.

Figure 3:
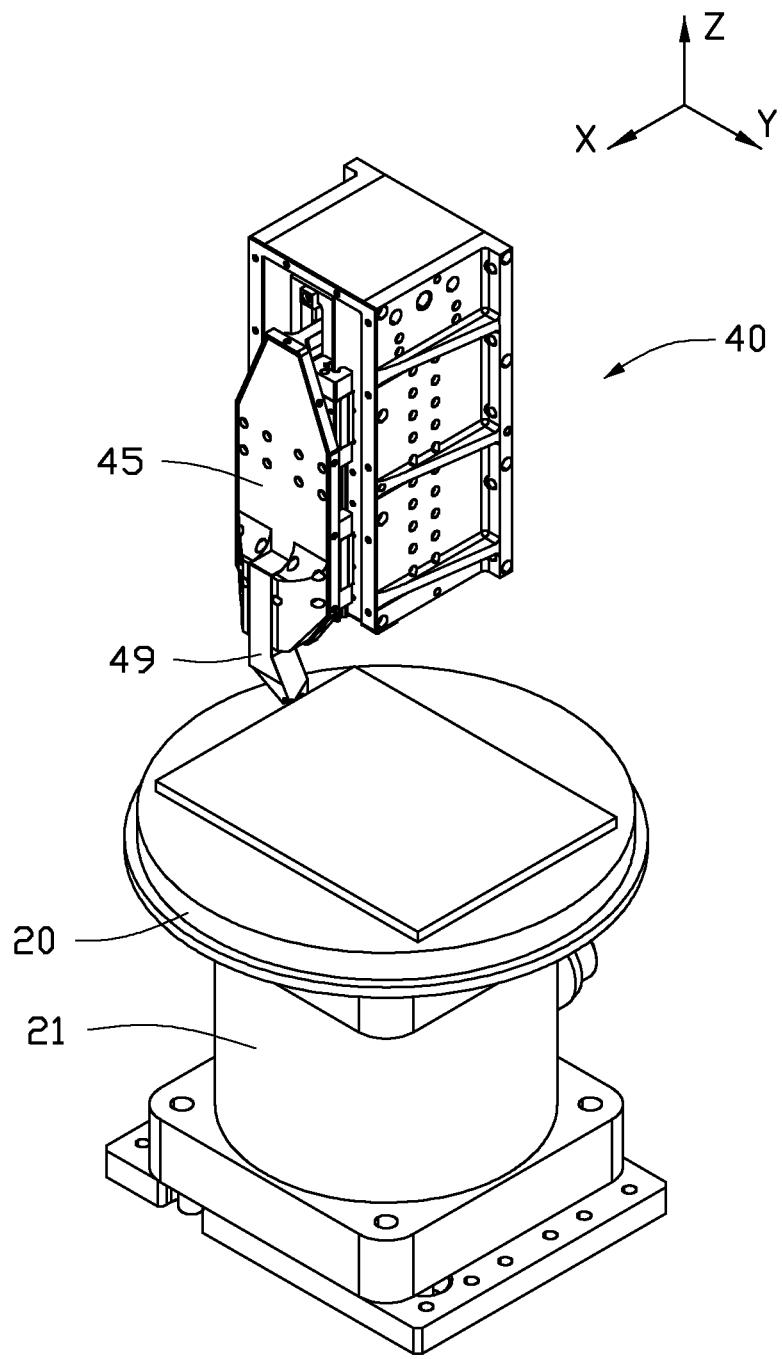
FIG. 3 shows an isometric view of the feeding device machining a workpiece.
Figure 4:
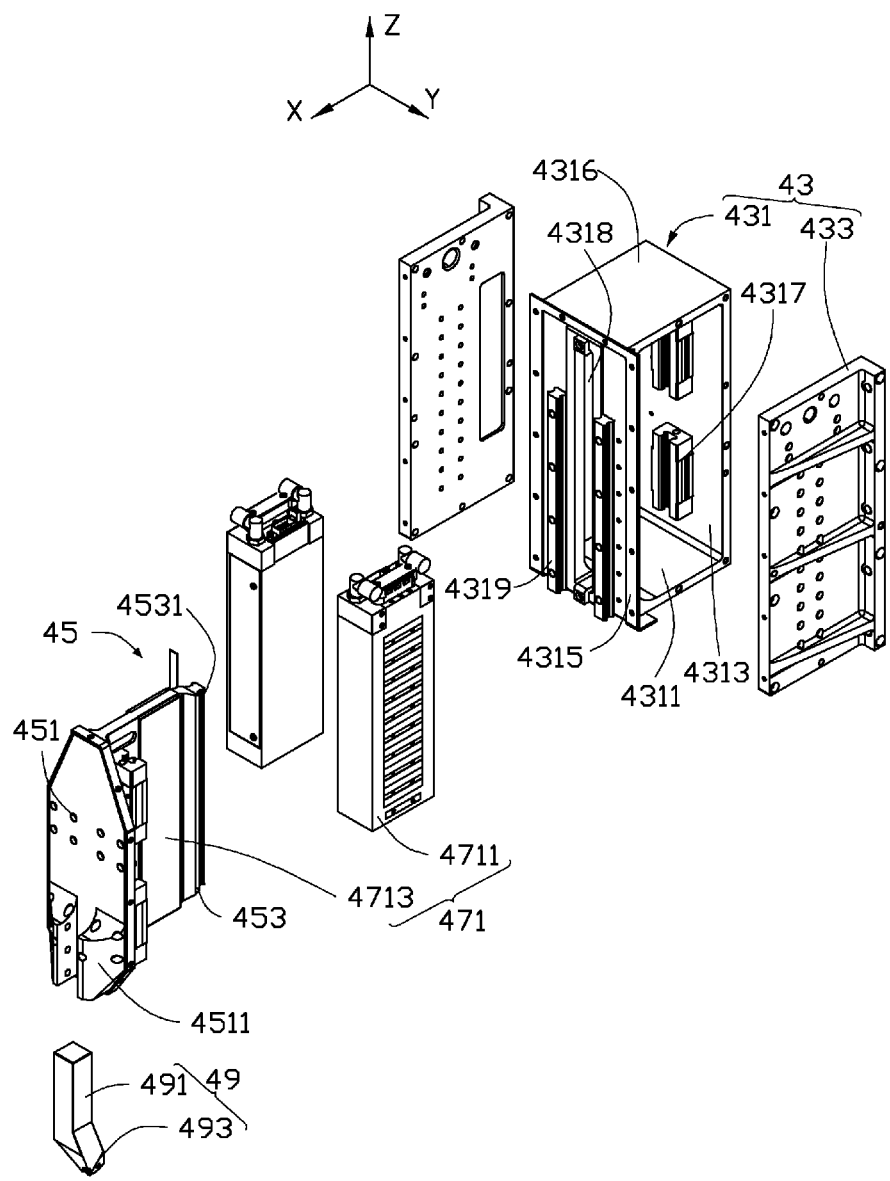
FIG. 4 is an exploded, isometric view of the feeding device of FIG. 3.
Figure 5:
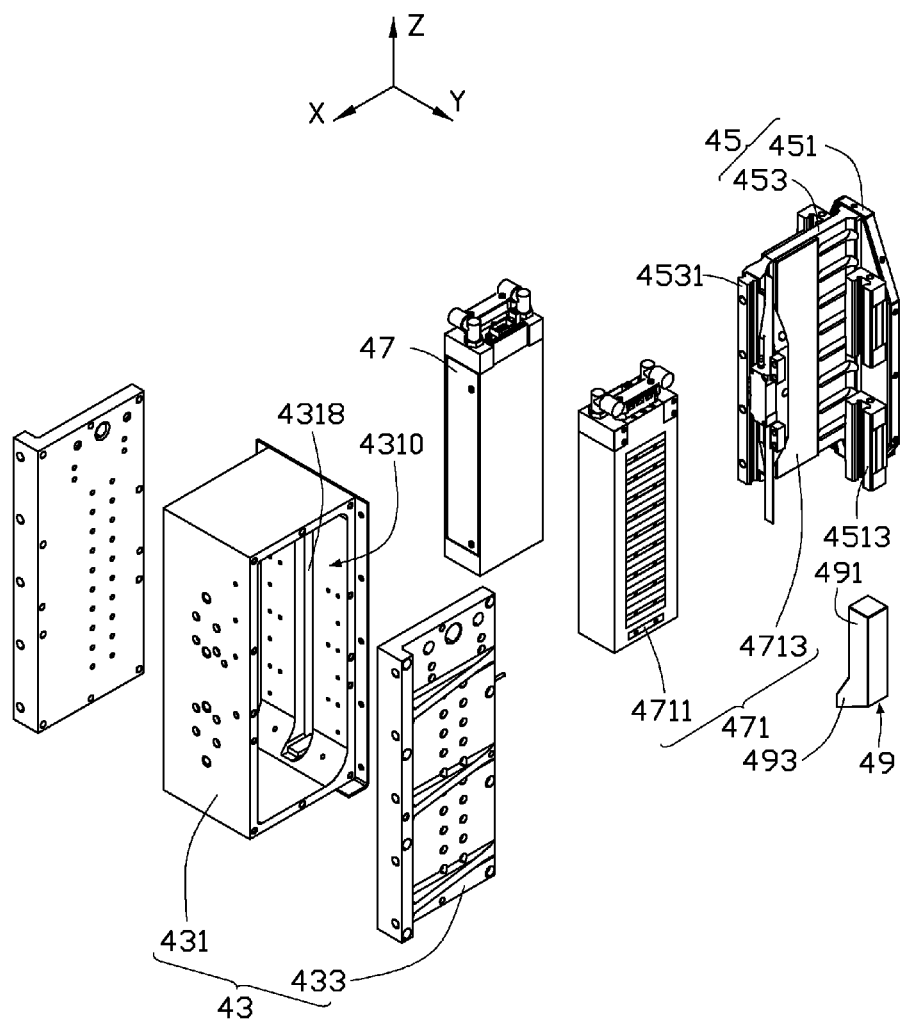
FIG. 5 is similar to FIG. 4, but viewed from another aspect.

Also referring to FIGS. 3 to 5, the feeding device 40 includes a mounting seat 43, a tool holder 45, two feeding mechanisms 47, and a cutting tool 49. The feeding mechanisms 47 are mounted and received in the mounting seat 43, and electrically connected to the controller. The tool holder 45 is slidably positioned on the mounting seat 43, and has a reciprocating motion parallel to the Z-axis relative to the mounting seat 43.

In the illustrated embodiment, referring again to FIG. 2, the feeding device 40 further includes a sliding saddle 41. The sliding saddle 41 is movably positioned on the mounting seat 43, and movably assembled with the cross beam 31. Two sliding blocks 411 are separately positioned on a surface of the sliding saddle 41 away from the tool holder 45, and parallel to the Y-axis towards the cross beam 31. The sliding blocks 411 are slidably engaged with the second sliding rails 311.

The mounting seat 43 includes a frame 431, and two mounting boards 433. The frame 431 includes a bottom wall 4311, a first side wall 4313, a second side wall 4315 and a top wall 4316. The first side wall 4313 and the second side wall 4315 extend perpendicularly from two ends of the bottom wall 4311 to connect with the top wall 4316, such that the bottom wall 4311, the first side wall 4313, the second side wall 4315 and the top wall 4316 cooperatively define a receiving space 4310. The bottom wall 4311 is positioned adjacent to the base 11. The first side wall 4313 is slidably connected with the sliding saddle 41. Two distanced guiding portions 4317 protrude from an inner surface of the first side wall 4313 facing toward the second side wall 4315 and extend parallel to the Z-axis. An elongated through groove 4318 is defined in the second side wall 4315 and extends along a direction parallel to the Z-axis. Two guiding portions 4319 protrude from an outer surface of the second side wall 4315 at two sides of the elongated through groove 4318. In the illustrated embodiment, the guiding portions 4319 are sliding rails, and the frame 431 is integrally formed. A mounting board 433 is installed on each of the two opening sides of the frame 431. Each mounting board 433 is perpendicularly connected with the bottom wall 4311, the first side wall 4313, the second side wall 4315 and a top wall 4316 for closing the frame 431.

The tool holder 45 slidably connects with the mounting seat 43. The tool holder 45 is substantially "T" shaped, and includes a main body 451 and a sliding board 453 substantially perpendicularly protruding from the main body 451. The main body 451 is a bar of material tapering in at both ends, and positioned outside of the mounting seat 43. Two distanced holding portions 4511 are positioned on a bottom of the main body 451 away from the sliding board 453. Four first direct portions 4513 (see FIG. 5) are positioned on a surface of the main body 451 adjacent to the sliding board 453. The four first direct portions 4513 are divided into two groups, each group having two guiding portions 4513 slidably engaged with one guiding portion 4319. The sliding board 453 is located between the two groups of the first direct portions 4513. The sliding board 453 passes through the through groove 4318 and is slidably attached to the two guiding portions 4317. A second direct portion 4531 is formed on an end of the sliding board 453 away from the main body 451, and received in the guiding portion 4317. In the illustrated embodiments, the first direct portions 4513 are sliding blocks and the second direct portion 4531 is a sliding rail.

The feeding mechanism 47 is mounted in the mounting seat 43, and includes two drivers 471. In the illustrated embodiment, the drivers 471 are linear motors. Each driver 471 includes a forcer 4711 and a stator 4713. Each forcer 4711 is fixed to a surface of a mounting board 433 facing the receiving space 4310, and is received in the receiving space 4310. The sliding board 453 is positioned between the two forcers 4711. The forcers 4711 produce alternating magnetic fields when the forcers 4711 are supplied with an alternating electrical current. Two stators 4713 are fixedly positioned on the opposite surfaces of the sliding board 453. Each stator 4713 is located between a forcer 4711 and the sliding board 453. Interactions between magnetic fields produced by the stators 4713 and the alternating magnetic fields which are produced by the forcers 4711 drive the tool holder 45 in a high speed reciprocating motion back and forth along the Z-axis. In other embodiments, the number of drivers 471 may be designed according to the application. For example, the two drivers 471 can take the place of a single, more powerful, driver, or three or more drivers can be positioned to drive the tool holder 45 to increase available power, and assembly of the drivers can be simple.

The cutter 49 is fixedly clamped between the two holding portions 4511 for machining curved surfaces of the workpiece 200. The cutter 49 includes a shank 491 and a cutter body 493 connected to the shank 491. The shank 491 is fixedly located between the two holding portions 4511. The cutter body 493 is positioned adjacent to the base 11. In the illustrated embodiment, the cutter 49 is a lathe tool.

In other embodiments, the mounting seat 43 may be fixedly positioned on the sliding saddle 41 when the machine tool 100 machines one particular type of workpiece 200. In other words, motion of the mounting seat 43 along the Z-axis direction may not be required. A driving mechanism electrically connected with the controller may be positioned in the feeding device 40 to drive the mounting seat 43 to slide along the sliding saddle 41 in the Z-axis. The sliding saddle 41 may be omitted, and the mounting seat 43 can be directly slidably positioned on the cross beam 31.

In other embodiments, the forcers 4711 may be directly installed on the frame 431. The alternating magnetic fields produced by the forcers 4711 drive the stators 4713 to move the tool holder 45 in a reciprocating motion at high speed along the guiding portions 4317.

In assembly, the work table 20 is positioned between the two support bodies 13. The cross beam 31 is installed on the two support bodies 13. The first driving mechanism 35 and the second mechanism 37 are mounted on the cross beam 31. The sliding saddle 41 is also positioned on the cross beam 31. The two stators 4713 are fixedly mounted on two surfaces of the sliding board 453. The sliding board 453 passes through the through groove 4318 and slidably connects with the second direct portion 4531. Each forcer 4711 is installed on one mounting board 433 and received in the mounting seat 43 together with the mounting board 433. The cutter 49 is fixedly mounted between the two holding portions 4511. Finally, the feeding device 40 is positioned on the sliding saddle 41 and electrically connected to the controller.

In use, the workpiece 200 is placed on the work table 20. The first driving mechanism 35 moves the moving device 30 along the first sliding rails 131 in the X-axis direction, the driving mechanism 37 moves the moving device 30 along the second sliding rails in the Y-axis direction, and the mounting seat 43 is slid on the sliding saddle 41 in the Z-axis direction under the control of the controller. The feeding device 40 arrives at any preset position for machining. The first driving mechanism 35 drives the moving device 30 to move along the first sliding rails 131 in the X-axis direction, the rotating driver 21 rotates the workpiece, and the cutter 49 is moved back and forth at high speed in the Z-axis direction by the drivers 471, for machining the workpiece 200 at the same time. The rotating speed of the rotating driver 21, and the speed and the range of movement of the cutter 49 are programmed according to cutting required for each machining portion of the workpiece 200. The planar machining path of the cutter 49 is substantially spiral. The feeding device 40 and the work table 20 stop moving, and the moving device 30 returns to the initial position after completing the machining. The workpiece 200 can then be unloaded from the work table 20.

The interaction between the alternating magnetic fields produced by the forcers 4711 and the magnetic fields produced by the stators 4713, drives the tool holder 45 and the cutter 49 in a controllable reciprocation, with high speed, along the guiding portion 4317 in the Z-axis for machining a curved surface on the workpiece 200. The feeding device 40 machines the workpiece 200 all the time and independently, at high speed in the Z-axis. There is no need to move the feeding device 40 during machining. Much time will be saved compared with the traditional feeding device, and better machining efficiency will be achieved. A milling cutter with different cutting edges is typically used for machining a curved surface. Tracks appear on the milled surface of the workpiece because of intermittent contact and interrupted milling by the cutter. A polishing process would need to be performed to the workpiece for a better appearance. However, no other process needs to be performed to the workpiece 200 after using the machine tool 100 because the cutter 49 is machining uninterruptedly.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A feeding device, comprising:
a mounting seat comprising at least one guiding portion;
a tool holder slidably engaging with the at least one guiding portion;
a cutter positioned on the tool holder; and
a feeding mechanism comprising at least two drivers, each driver comprising a forcer mounted in the mounting seat and a stator fixedly positioned on the tool holder,
wherein interactions between alternating magnetic fields produced by the forcers and magnetic fields produced by the stators drive the tool holder and the cutter backwards and forwards under precise control along the at least one guiding portion.

2. The feeding device of claim 1, wherein the tool holder comprises a main body and a sliding board protruding from the main body, the sliding board extends into the mounting seat and slidably connects with the at least one guiding portion, and the main body is positioned outside of the mounting seat and fixedly connects with the cutter.

3. The feeding device of claim 2, wherein the mounting seat comprises a frame defining two opening sides, and two mounting boards mounted on the frame to close the two opening sides of the frame, the at least one guiding portion is positioned on an inner surface of the frame, and the at least one forcer is fixed to one of the two mounting boards and received in the frame.

4. The feeding device of claim 3, wherein the frame further comprises a bottom wall, a first side wall, a second side wall, and a top wall, the first side wall and the second side wall extend from two ends of the bottom wall, the top wall is connected with the first side wall and the second side wall and positioned away from the bottom wall, the at least one guiding portion is formed on a surface of the first side wall facing the first side wall; the bottom wall, the first side wall, the second side wall, and the top wall cooperatively forming the frame defining the two opening sides.

5. The feeding device of claim 4, wherein a through groove is defined though the second side wall, and the sliding board passes through the through groove.

6. The feeding device of claim 2, wherein the mounting seat further comprises a mounting seat body and the at least one guiding portion protruding from a side surface of the mounting seat body facing the main body, the main body comprises at least one first direct portion, and the at least one first direct portion is slidably connected with the at least one guiding portion.

7. The feeding device of claim 2, wherein the sliding board comprises a sliding board body and a second direct portion positioned on the end of the sliding board body away from the main body and slidably attached to the at least one guiding portion.

8. The feeding device of claim 1, wherein the main body comprises two holding portions positioned apart on a bottom of the main body away from the sliding board, and the cutter is fixed between the two holding portions.

9. A machine tool, comprising:
a machine support;
a work table positioned on the machine support:
a moving device mounted on the machine support above the work table; and
a feeding device comprising a tool holder, a feeding mechanism, a cutter positioned on the tool holder, and a mounting seat positioned on the moving device, wherein the moving device comprises at least one guiding portion, the tool holder slidably engages with the at least one guiding portion, a feeding mechanism comprises at least two drivers, each driver comprises a forcer and a stator, the forcers are mounted in the mounting seat, the stators are fixedly positioned on the tool holder, interactions between alternating magnetic fields produced by the forcers and magnetic fields produced by the stators drive the tool holder and the cutter backwards and forwards under precise control along the at least one guiding portion.

10. The machine tool of claim 9, wherein the feeding device further comprises a sliding saddle and a mounting seat is slidably connected with the moving device via the sliding saddle.

11. The machine tool of claim 9, wherein the moving device comprises a cross beam and at least one first driving mechanism, the cross beam is slidably connected with the machine support and above the work table, the at least one first driving mechanism drives the cross beam to move on the machine support.

12. The machine tool of claim 11, wherein the machine support comprises a base and two support bodies, the two support bodies are positioned parallel and apart on the base, the cross beam is slidably connected with the two support bodies, and the at least one first driving mechanism drives the cross beam to move along the support bodies.

13. The machine tool of claim 10, wherein the moving device further comprises at least one second mechanism mounted on the cross beam for driving the feeding device to move along the cross beam.

14. A machine tool, comprising:
a machine support;
a work table positioned on the machine support:
a moving device mounted on the machine support above the work table; and
a feeding device comprising a tool holder, a feeding mechanism, a cutter positioned on the tool holder, and a mounting seat fixedly positioned on the moving device, wherein the moving device comprises at least one guiding portion, the tool holder slidably engages with the at least one guiding portion, a feeding mechanism comprises at least two drivers, each driver comprises a forcer and a stator, the forcers are mounted in the mounting seat, the stators are fixedly positioned on the tool holder, and interactions between alternating magnetic fields produced by the forcers and magnetic fields produced by the stators drive the tool holder and the cutter backwards and forwards under precise control along the at least one guiding portion.

15. The machine tool of claim 14, wherein the moving device comprises a cross beam and at least one first driving mechanism, the cross beam is slidably connected with the machine support above the work table, and the at least one first driving mechanism drives the cross beam to move along the machine support.

16. The machine tool of claim 15, wherein the machine support comprises a base and two support bodies, the two support bodies are positioned parallel on the base, the cross beam is slidably connected with the two support bodies, and the first driving mechanism drives the cross beam to move along the support bodies.

17. The machine tool of claim 14, wherein the tool holder comprises a main body and a sliding board protruding from the main body, the sliding board extends into the mounting seat and slidably connects with at least one guiding portion, and the main body is positioned outside of the mounting seat and fixedly connects with the cutter.

18. The machine tool of claim 17, wherein the mounting seat comprises a frame having two opening sides, and two mounting boards mounted on the frame to close the opening sides of the frame, the at least one guiding portion is positioned on an inner surface of the frame, and the forcers are mounted on the two mounting boards and received in the frame.

19. The machine tool of claim 17, wherein the main body comprises two holding portions positioned on a bottom of the main body away from the sliding board, and the cutter is fixed between the two holding portions.

20. The machine tool of claim 14, wherein the cutter is a lathe tool.

\* \* \* \* \*